United States Patent
Kunchakarra et al.

(10) Patent No.: US 12,045,195 B2
(45) Date of Patent: *Jul. 23, 2024

(54) EFFICIENT CONFIGURATION COMPLIANCE VERIFICATION OF RESOURCES IN A TARGET ENVIRONMENT OF A COMPUTING SYSTEM

(71) Applicant: Capitis Solutions Inc., Clarksville, MD (US)

(72) Inventors: Prasad V. Kunchakarra, Clarksville, MD (US); Vikas K. Gupta, Clarksville, MD (US); Eric C. Hein, Clarksville, MD (US); Ian B Savage, Clarksville, MD (US); Sanjay K. Kunchakarra, Clarksville, MD (US)

(73) Assignee: CAPITIS SOLUTIONS INC., Clarksville, MD (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/858,593

(22) Filed: Jul. 6, 2022

(65) Prior Publication Data

US 2022/0342846 A1 Oct. 27, 2022

Related U.S. Application Data

(63) Continuation of application No. 16/865,499, filed on May 4, 2020, now Pat. No. 11,409,697.

(Continued)

(51) Int. Cl.
*G06F 16/11* (2019.01)
*G06F 8/71* (2018.01)
(Continued)

(52) U.S. Cl.
CPC .............. *G06F 16/122* (2019.01); *G06F 8/71* (2013.01); *G06F 9/44505* (2013.01);
(Continued)

(58) Field of Classification Search
CPC ...... G06F 16/122; G06F 8/71; G06F 9/44505; G06F 11/3688; G06F 16/144; G06F 16/1734; G06F 16/182; G06N 20/00
See application file for complete search history.

(56) References Cited

U.S. PATENT DOCUMENTS 10,257,217 B2 * 4/2019 Hamdi ................ G06F 12/0897
10,412,110 B2 * 9/2019 Hamdi ...................... G06F 7/24
(Continued)

*Primary Examiner* — Angelica Ruiz
(74) *Attorney, Agent, or Firm* — Raj S. Dave; Dave Law Group LLC

(57) ABSTRACT

A method includes executing a configuration engine on one or more data processing device(s) of a computing system. In accordance with the execution, the method also includes discovering at least a subset of a number of resources associated with a target environment of the computing system, generating an environment definition associated with the target environment, building baseline configurations, policies and metadata for at least the subset of the number of resources, and versioning the aforementioned data. Further, the method includes, in accordance with tracking the metadata versioned in the repository, automatically scanning at least the subset of the number of resources and retrieving a first and/or a second specific configuration based on the scanning, and automatically determining a misconfiguration based on comparing the first specific configuration to a corresponding baseline configuration and/or verifying that a sequence of configurations is correctly defined based on the second specific configuration.

24 Claims, 7 Drawing Sheets

Related U.S. Application Data

(60) Provisional application No. 62/888,514, filed on Aug. 18, 2019.

(51) Int. Cl.
| | | |
|---|---|---|
| *G06F 9/445* | (2018.01) | |
| *G06F 11/36* | (2006.01) | |
| *G06F 16/14* | (2019.01) | |
| *G06F 16/17* | (2019.01) | |
| *G06F 16/182* | (2019.01) | |
| *G06N 20/00* | (2019.01) | |

(52) U.S. Cl.
CPC ........ *G06F 11/3688* (2013.01); *G06F 16/144* (2019.01); *G06F 16/1734* (2019.01); *G06F 16/182* (2019.01); *G06N 20/00* (2019.01)

(56) References Cited

U.S. PATENT DOCUMENTS

| | | | |
|---|---|---|---|
| 10,965,707 B2 * | 3/2021 | Kraning | .............. H04L 63/0227 |
| 2016/0306337 A1 | 10/2016 | Gandelsman | |
| 2018/0004942 A1 | 1/2018 | Martin et al. | |
| 2018/0375748 A1 * | 12/2018 | Russell | ................... H04L 43/08 |

* cited by examiner

EFFICIENT CONFIGURATION COMPLIANCE VERIFICATION OF RESOURCES IN A TARGET ENVIRONMENT OF A COMPUTING SYSTEM

CROSS-REFERENCE TO RELATED APPLICATIONS

The present application is a continuation application of U.S. patent application Ser. No. 16/865,499 titled "EFFICIENT CONFIGURATION COMPLIANCE VERIFICATION OF RESOURCES IN A TARGET ENVIRONMENT OF A COMPUTING SYSTEM" filed on May 4, 2020, which claims priority to U.S. Provisional Application No. 62/888,514, entitled "METHOD AND APPARATUS FOR APPLICATION SECURITY CONFIGURATION COMPLIANCE VERIFICATION SOLUTION," filed on Aug. 18, 2019. The contents of the aforementioned application are incorporated by reference in their entirety.

FIELD OF THE INVENTION

This disclosure relates generally to computing systems configuration management and, more particularly, to efficient configuration compliance verification of resources in a target environment of a computing system.

BACKGROUND

Compliance specific to security in a traditional computing system may involve implementing boundary controls at network and infrastructure layers of a system architecture model thereof. With increasing threats posed by external and internal actors, information security teams associated with the traditional computing system are now increasingly aware of controls for protecting data at rest and data in motion through encryption. Also, penetration testing and security vulnerability management in the traditional computing system has matured considerably. However, little attention has been directed toward hardening and configuration management of applications and vendor products such as databases, application servers and web servers within the traditional computing system. Further, configuration management of applications, microservices, infrastructure, platform services, Software-as-a-Service (SaaS) services have not been given full attention from a functional and/or a non-functional perspective as standalone resources and/or interoperable elements (e.g., resource-to-resource interfaces, integrations; compatible elements).

A functional configuration maybe a configuration related to an actual working of a computing system to create functional value thereof. The function configuration may simply deal with one or more functional features of the aforementioned computing system. A non-functional configuration may refer to one or more features of the system that are pertinent to characteristics including but not limited to availability, performance, resilience, scalability, throughput, and response time. Security configurations may deal with security controls implementations such as encryption algorithm types and secure protocol types.

A misconfiguration can contribute to one or more of the above issues related to security, functionality, performance, availability, resilience, throughput, and response time. During the lifecycle of a computing system, resources configurations may change. A change in one or more resource configurations may have side effects. A change to a security configuration of a computing network may make an application non-functional, lead to suboptimal performance thereof and/or may lead to data loss.

Personnel associated with the traditional computing system may operate in silos. The lack of ready availability of configuration information across the traditional computing system may render the abovementioned misconfigurations (e.g., security, functional and/or non-functional aspects thereof) difficult to handle. Data losses and security compromises ensuing from the aforementioned security misconfigurations may render recovery costs prohibitive. Additionally, a functional misconfiguration may render the computing system incapable of delivering business value, and a non-functional misconfiguration may cause a user of the computing system to experience degraded performance or in, some cases, unavailability of one or more resources.

SUMMARY OF INVENTION

Disclosed are a method, a non-transitory medium and/or a system of efficient configuration compliance verification of resources in a target environment of a computing system.

An embodiment relates to a method including executing a configuration engine on one or more data processing device(s) of a computing system including a number of resources across a computer network. The number of resources includes a number of data processing devices including the one or more data processing device(s) and components associated therewith executing across the number of data processing devices. The method also includes, in accordance with an execution of the configuration engine, discovering at least a subset of the number of resources that is associated with a target environment of the computing system based on querying a first metadata associated with the number of resources in the target environment, and in accordance with a discovery, generating an environment definition associated with the target environment based on combining information relevant to test configurations pertinent to all resources corresponding to at least the subset of the number of resources from all layers of a multi-layered system architectural model of the target environment.

A multi-layered system architectural model specifies connections across all the resources corresponding to at least the subset of the number of resources, and an environment definition specifies configuration requirements of at least the subset of the number of resources in the target environment. The method further includes, in accordance with the execution of the configuration engine, building a baseline configuration and a policy for at least the subset of the number of resources in accordance with the environment definition, building a second metadata for at least the subset of the number of resources in accordance with the policy, with the second metadata providing a number of contexts to the environment definition, and versioning, in a repository of the computing system, the environment definition, the baseline configuration, the policy, the second metadata, and a test instruction pertinent to scanning the target environment for configurations.

In accordance with tracking the second metadata versioned in the repository, the method still further includes automatically scanning at least the subset of the number of resources in accordance with the environment definition based on executing the test instruction pertinent to scanning the target environment for configurations and retrieving a first specific configuration and/or a second specific configuration therefrom based on the scanning, and automatically determining a misconfiguration based on comparing the first specific configuration to a corresponding baseline configuration versioned in the repository and/or verifying that a sequence of configurations is correctly defined based on the second specific configuration.

An embodiment further comprises, in accordance with the execution of the configuration engine and the tracking of the second metadata versioned in the repository, automatically remediating the misconfiguration in accordance with a corresponding policy versioned in the repository.

An embodiment further comprises enabling, based on the execution of the configuration engine, at least one of: identifying and automatically predicting a root cause of the misconfiguration at least one of: manually and through machine learning algorithms executing in conjunction with the configuration engine in the computing system.

An embodiment further comprises determining, in accordance with the execution of the configuration engine, a boundary and elements of an environment definition utilizing threat modeling that incorporates the multi-layered system architectural model.

An embodiment further comprises providing, through the configuration engine, compatibility with the number of resources comprising at least one of: custom applications, an edge computing device, a computing related service, an infrastructure related service, a function related service, a software service and a data service.

An embodiment further comprises tracking, through the execution of the configuration engine, at least one of: a first temporal drift in the environment definition, the baseline configuration, the policy and/or the second metadata, and a second temporal drift in the first specific configuration.

An embodiment further comprises providing, through the configuration engine, compatibility with the computing system comprising at least one of: a cloud computing system and an on-premise data center.

An embodiment further comprises distributed execution of the configuration engine across the computing system.

Another embodiment relates to a non-transitory medium, readable through one or more data processing device(s) of a computing system and including instructions embodied therein, with the instructions configured to execute on the one or more data processing device(s). The non-transitory medium includes the instructions to execute a configuration engine on the one or more data processing device(s), the computing system includes a number of resources across a computer network, and the number of resources includes a number of data processing devices including the one or more data processing device(s) and components associated therewith executing across the number of data processing devices. In accordance with an execution of the configuration engine, the non-transitory medium includes instructions to discover at least a subset of the number of resources that is associated with a target environment of the computing system based on querying a first metadata associated with the number of resources in the target environment, and, in accordance with a discovery, generate an environment definition associated with the target environment based on combining information relevant to test configurations pertinent to all resources corresponding to at least the subset of the number of resources from all layers of a multi-layered system architectural model of the target environment.

A multi-layered system architectural model specifies connections across all the resources corresponding to at least the subset of the number of resources, and an environment definition specifies configuration requirements of at least the subset of the number of resources in the target environment. In accordance with the execution of the configuration engine, the non-transitory medium also includes instructions to build a baseline configuration and a policy for at least the subset of the number of resources in accordance with the environment definition, build a second metadata for at least the subset of the number of resources in accordance with the policy, with the second metadata providing a number of contexts to the environment definition, and version, in a repository of the computing system, the environment definition, the baseline configuration, the policy, the second metadata, and a test instruction pertinent to scanning the target environment for configurations.

In accordance with tracking the second metadata versioned in the repository, the non-transitory medium further includes instructions to automatically scan at least the subset of the number of resources in accordance with the environment definition based on executing the test instruction pertinent to scanning the target environment for configurations and retrieve a first specific configuration and/or a second specific configuration therefrom based on the scanning, and automatically determine a misconfiguration based on comparing the first specific configuration to a corresponding baseline configuration versioned in the repository and/or verify that a sequence of configurations is correctly defined based on the second specific configuration.

An embodiment further comprises in accordance with the execution of the configuration engine and the tracking of the second metadata versioned in the repository, additional instructions to automatically remediate the misconfiguration in accordance with a corresponding policy versioned in the repository.

An embodiment further comprises additional instructions to enable, based on the execution of the configuration engine, at least one of: identifying and automatically predicting a root cause of the misconfiguration at least one of: manually and through machine learning algorithms executing in conjunction with the configuration engine in the computing system.

An embodiment further comprises additional instructions to determine, in accordance with the execution of the configuration engine, a boundary and elements of an environment definition utilizing threat modeling that incorporates the multi-layered system architectural model.

An embodiment further comprises additional instructions compatible between the configuration engine and the number of resources comprising at least one of: custom applications, an edge computing device, a computing related service, an infrastructure related service, a function related service, a software service and a data service.

An embodiment further comprises additional instructions to track, based on the execution of the configuration engine, at least one of a first temporal drift in the environment definition, the baseline configuration, the policy and/or the second metadata, and a second temporal drift in the first specific configuration.

An embodiment relates to a computing system including a computer network, and a number of resources across the computer network. The number of resources includes a number of data processing devices and components associated therewith executing across the number of data processing devices. One or more data processing device(s) of the number of data processing devices is configured to execute a configuration engine thereon. In accordance with an execution of the configuration engine, the one or more data processing device(s) is configured to discover at least a subset of the number of resources associated with a target environment of the computing system based on querying a first metadata associated with the number of resources in the target environment, and, in accordance with a discovery, generate an environment definition associated with the target environment based on combining information relevant to test configurations pertinent to all resources corresponding to at least the subset of the number of resources from all layers of a multi-layered system architectural model of the target environment.

A multi-layered system architectural model specifies connections across all the resources corresponding to at least the subset of the number of resources, and an environment definition specifies configuration requirements of at least the subset of the number of resources in the target environment. The one or more data processing device(s) is also configured to, based on the execution of the configuration engine, build a baseline configuration and a policy for at least the subset of the number of resources in accordance with a generated environment definition, build a second metadata for at least the subset of the number of resources in accordance with a built policy, with the second metadata providing a number of contexts to the environment definition, and version, in a repository of the computing system, the environment definition, the baseline configuration, the policy, the second metadata, and a test instruction pertinent to scanning the target environment for configurations.

In accordance with tracking the second metadata versioned in the repository, the one or more data processing device(s) is further configured to automatically scan at least the subset of the number of resources in accordance with the environment definition based on executing the test instruction pertinent to scanning the target environment for configurations and retrieve a first and/or a specific configuration therefrom based on the scanning, and automatically determine a misconfiguration based on comparing the first specific configuration to a corresponding built baseline configuration versioned in the repository and/or verify that a sequence of configurations is correctly defined based on the second specific configuration.

An embodiment relates to the one or more data processing device(s) further configured to, in accordance with the execution of the configuration engine and the tracking of the second metadata versioned in the repository, automatically remediate the misconfiguration in accordance with a corresponding policy versioned in the repository.

An embodiment relates to the one or more data processing device(s) further configured to enable, based on the execution of the configuration engine, at least one of: identifying and automatically predicting a root cause of the misconfiguration at least one of: manually and through machine learning algorithms executing in conjunction with the configuration engine in the computing system.

In an embodiment, the one or more data processing device(s) is further configured to determine, in accordance with the execution of the configuration engine, a boundary and elements of an environment definition utilizing threat modeling that incorporates the multi-layered system architectural model.

In an embodiment, the number of resources comprises at least one of: custom applications, an edge computing device, a computing related service, an infrastructure related service, a function related service, a software service and a data service.

In an embodiment, the one or more data processing device(s) is further configured to track, through the execution of the configuration engine, at least one of: a first temporal drift in the versioned environment definition, baseline configuration, the policy and/or the second metadata, and a second temporal drift in the second specific configuration.

An embodiment further comprises at least one of: a cloud computing system and an on-premise data center.

In an embodiment, the configuration engine executes in a distributed manner across the computing system.

In an embodiment, the number of data processing devices comprises at least one of: a desktop computer, a laptop, a notebook computer and a smart device.

An embodiment further comprises at least one of: a traditional, a hybrid and a cloud computing platform.

An embodiment further relates to the one or more data processing device(s) being further configured to track, based on the execution of the configuration engine, at least one of: a first temporal drift in at least one of: the environment definition, the baseline configuration, the policy and the second metadata, and a second temporal drift in the first specific configuration.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
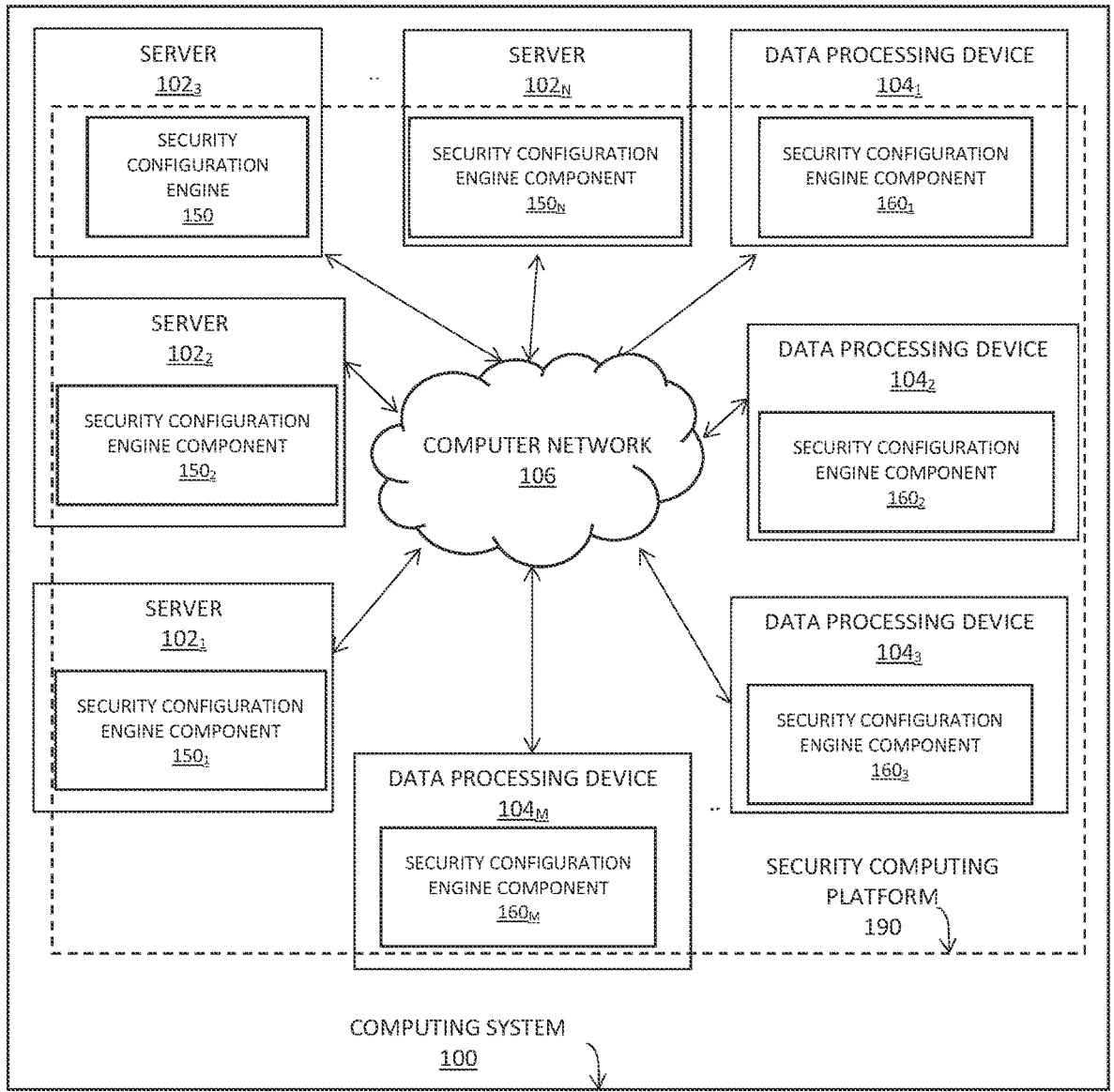
FIG. 1 is a schematic view of a computing system, according to one or more embodiments.

Other features of the present embodiments will be apparent from the accompanying drawings and from the detailed description that follows.

DETAILED DESCRIPTION

The articles "a" and "an" are used herein refers to one or to more than one (i.e., to at least one) of the grammatical object of the article. By way of example, "an element" means one element or more than one element.

In order to fully understand the scope of the invention, the following terms used herein are hereby defined.

The term "comprising", which is synonymous with "including", "containing", or "characterized by" here is defined as being inclusive or open-ended, and does not exclude additional, unrecited elements or method steps, unless the context clearly requires otherwise.

The term, "a plurality of" is defined as multiple.

The term, "computer network" is defined as a plurality of computers that are interconnected so they can exchange information.

The term, "device" is defined as an electronic element that cannot be divided without destroying its stated function.

The term, "user" includes a person or a computer.

The term, "data processing" is defined as the manipulation of data which performs some operation or sequence of operations on the data.

The term, "server" is defined as a computer that manages network resources.

The term, "communicatively coupled" is defined as devices connected in a way that permits communication.

The term, "database" is defined as a comprehensive collection of related data organized for convenient access.

The term, "configuration" is defined as the arrangement within the system of each of its functional units, according to their nature, number and chief characteristics.

The term, "misconfiguration" is defined as an incorrect or inappropriate configuration.

The term, "repository" is defined as a database in which an aggregation of data is kept and maintained in an organized way.

The term, "execute" is defined as the process by which a computer or a virtual machine executes the instructions of a computer program.

The term, "environment" is defined as the state of a computer, determined by a combination of software, hardware, data and which programs are running.

The term, "application" is defined as a program or piece of software designed to fulfil a particular purpose.

The term, "metadata" is defined as a set of data that describes and gives information about other data.

The term "temporal drift" is defined as change in an attribute, value, or operational resource of a system over time.

Example embodiments, as described below, may be used to provide efficient configuration compliance verification of resources in a target environment of a computing system. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments. Those skilled in the art will appreciate that the invention may be practiced for any configuration resource.

FIG. 1 shows a computing system 100, according to one or more embodiments. In one or more embodiments, computing system 100 may include a number of servers 102$_1$-N communicatively coupled to one another and a number of data processing devices 104$_1$-M through a computer network 106. In one or more embodiments, computer network 106 may be a Local Area Network (LAN), a Wide Area Network (WAN) and/or a short-range network (e.g., based on Bluetooth®, WiFi et al.). Other forms of computer network 106 are within the scope of the exemplary embodiments discussed herein. Concepts associated with the exemplary embodiments may be applicable across a wide range of data processing devices 104$_1$-M including but not limited to desktops, laptops, notebooks and smart devices such as smart televisions, smart media players, Internet of Things (IoT) devices and pacemaker devices.

It should be noted that computing system 100 may preferentially be an Enterprise Information System (EIS) that integrates a number of systems associated with enterprise-related operations. Other contexts involving concepts associated with the exemplary embodiments discussed herein are within the scope of the exemplary embodiments. Thus, one or more of servers 102$_1$-N may be a database server, a server dedicated to executing an application server, a data center device, a server dedicated to executing a web server and/or a Content Delivery Network (CDN). The database server (e.g., a server providing database services in computing system 100), the application server (e.g., a set of software components enabling operations between applications (e.g., business applications) and users; said applications may be at a backend of computing system 100) and the web server (e.g., a set of software components enabling content or services to the users through, say, the Internet) are well known to one skilled in the art. Detailed discussion associated therewith has been skipped for the case of convenience and brevity.

At least some of servers 102$_1$-N may execute one or more operations thereof physically thereon. Additionally, or alternatively, one or more servers 102$_1$-N may have a number of virtual machines (VMs) emulated thereon; here, the one or more servers 102$_1$-N may serve as the "host" and the number of VMs may be the "guests" utilizing resources of said "host." In the case of computing system 100 being cloud based, one or more servers 102$_1$-N may represent data centers, enterprise private clouds and/or cloud providers (e.g., providing cloud based services and/or solutions) and one or more data processing devices 104$_1$-M may represent edge computing devices/implementations such as IoT devices, gateways, autonomous vehicular controls, personal health devices, remote medical equipment, implanted medical devices and drones. Some of the aforementioned edge computing devices/implementations may, alternatively or additionally, be represented by one or more servers 102$_1$-N. It should be noted that the CDN discussed above may be regarded as representing edge computing devices.

Exemplary embodiments discussed herein improve computing system 100 from the perspective of security, functional and non-functional aspects thereof specifically by automatically identifying and remediating misconfigurations of custom applications and related components in computing system 100. The aforementioned may ensure that the functional configuration requirements of computing system 100 are met and may also increase non-functional aspects including reliability, availability, and performance of components (e.g., servers 102$_1$-N, data processing devices 104$_1$-M, applications and related components and functionalities thereof) of computing system 100. In one or more embodiments, the improved security may mitigate adversarial threats such as those arising from Distributed Denial of Service (DDoS) attacks and data (and, thereby, Intellectual Property (IP)) exfiltration. Further, exemplary embodiments discussed herein may improve efficiency associated with security audits through efficient validation of security configurations and remediation of misconfigurations associated with computing system 100.

As discussed and implied above, computing system 100 may not merely be limited to traditional data centers but may also include multi-cloud environments and edge computing devices. Exemplary embodiments discussed herein may be related to a security configuration engine 150 (to be discussed below) that performs the abovementioned automatic security configuration compliance verification and remediation of security misconfigurations. While the figures discussed herein are specifically directed to security, it should be noted that concepts discussed herein may additionally encompass functional and non-functional aspects of computing system 100 and remediating misconfigurations associated therewith. Specifically, in one or more embodiments, security configuration engine 150 may scan, analyze, visualize and report security misconfigurations of a multitude of custom applications, data, vendor products and services such as Infrastructure as a Service (IaaS), Platform as a Service (PaaS) and Software as a Service (SaaS) associated with computing system 100. In one or more embodiments, the aforementioned processing associated with security misconfigurations may span even multiple hybrid and edge computing devices. In one or more embodiments, all processing associated with identifying, protecting and detecting security threats, recovering therefrom and remediation may be performed through security configuration engine 150 (to be discussed below).

FIG. 1 shows security configuration engine 150 implemented within computing system 100 on a server 1023, according to one or more embodiments. In one or more embodiments, security configuration engine 150 may be configured to execute on a security computing platform 190 that represents an environment (e.g., hardware, operating system(s), browsers, Application Programming Interface(s) (API(s))) in which components/engines of security configuration engine 150 are configured to execute. In one or more embodiments, server(s) 1021-N and data processing devices 1041-M may include processors and memories (e.g., volatile and/or non-volatile memories) configured to execute instructions associated with security configuration engine 150 and components (to be discussed below) thereof.

FIG. 1 shows each of the servers other than (e.g., servers 1021-2 and servers 1024-N) server 1023 executing a security configuration engine component (e.g., security configuration engine component 1501-2 and security configuration engine component 1504-N) configured to perform operations specified by security configuration engine 150. Similarly, FIG. 1 shows each of data processing devices 1041-M executing the security configuration engine component 1601-M (analogous to security configuration engine component 1501-2, 1504-N) thereon. It should be noted that security computing platform 190 may be a distributed computing platform; accordingly, the physical and virtual components associated with servers 1021-N and data processing devices 1041-M may be considered as being associated with security computing platform 190 by way of security configuration engine 150 and the security configuration engine components (e.g., security configuration engine components 1501-2, security configuration engine components 1504-N, security configuration engine components 1601-M)

Figure 2:
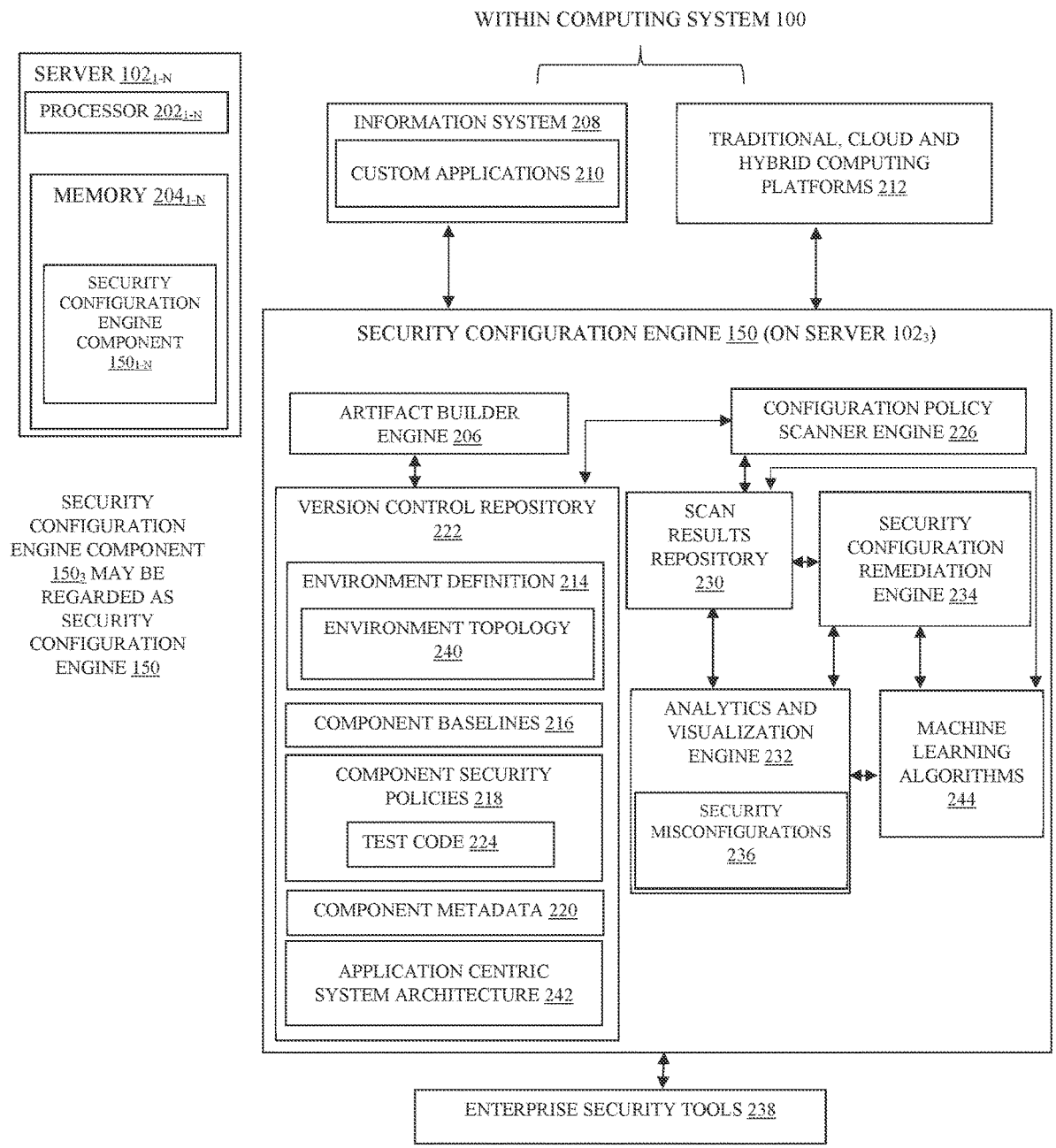
FIG. 2 is a conceptual architectural view of a security configuration engine of the computing system of FIG. 1, according to one or more embodiments.

FIG. 2 shows each server 1021-N as including a processor 2021-N communicatively coupled to a memory 2041-N, according to one or more embodiments. It should be noted that server 1021-N and security configuration engine 150 may be distributed across computing system 100; in other words, server 1021-N may represent more than one server 1021-N of computing system 100; security configuration engine 150 may execute on more than one server 1021-N. FIG. 1 shows server 1023 as solely executing security configuration engine 150 merely for the sake of illustration. Specifically, server 1023 is shown as including instructions associated with security configuration engine 150 stored in memory 2043; security configuration engine 150 is configured to execute on processor 2023.

FIG. 2 shows a conceptual architecture of security configuration engine 150, according to one or more embodiments. In accordance therewith, in one or more embodiments, security configuration engine 150 may provide security configuration engine components 1501-2, security configuration engine components 1504-N and security configuration engine components 1601-M the capabilities to perform operations that enable scanning and analyzing security configurations of all elements/components of computing system 100 and reporting security misconfigurations therethrough. It should be noted that the computing environment associated with security computing platform 190 may encompass the entire computing environment associated with computing system 100 to which security policies are applicable. In one or more embodiments, an artifact builder engine 206 may discover resources in the entire computing environment (or, target a specific environment, as will be discussed below) associated with computing system 100. As shown in FIG. 2, artifact builder engine 206 may discover resources in an information system 208 with custom applications 210 within computing system 100 and in traditional, cloud and hybrid computing platforms 212 within computing system 100; the types of resources are discussed in detail above (and below).

It should be noted that the entire computing environment of computing system 100 may not be limited to information system 208 and traditional, cloud and hybrid computing platforms 212 within computing system 100 and that the aforementioned alone have been shown in FIG. 2 merely for the sake of illustration; alternatively, information system 208 and traditional, cloud and hybrid computing platforms 212 may constitute a target environment (to be discussed below). In one or more embodiments, custom applications 210 may include software applications designed for an organization, a set of organizations and/or a set of users within the organization; custom applications 210 may also be applications designed or customized for clients/customers of one or more organizations. In one or more embodiments, in accordance with the discovery of resources through artifact builder engine 206 discussed above, artifact builder engine 206 may create an environment definition 214 of the entire computing environment (or, a target environment) of computing system 100; environment definition 214 is shown as part of version control repository 222 in FIG. 2.

In addition, in one or more embodiments, artifact builder engine 206 may build baselines, security policies and metadata for components of the resources discovered, shown as component baselines 216, component security policies 218 and component metadata 220 respectively in FIG. 2. In one or more embodiments, environment definition 214 may include but is not limited to configuration information (e.g., security configuration information) of servers 1021-N, data processing devices 1041-M, custom applications 210, traditional, cloud and hybrid computing platforms 212 and components (e.g., database schema, user entitlements). It should be noted that information system 208 may encompass servers 1021-N and data processing devices 1041-M and custom applications 210 within information system 208 may execute on one or more servers 1021-N and one or more data processing devices 1041-M. FIG. 2 shows custom applications 210 executing on a data processing device 1041-M for the sake of illustration.

In one or more embodiments, environment definition 214 may be dynamically created by artifact builder engine 206 following the discovery of resources/components in the entire computing environment associated with computing system 100. Alternatively or additionally, in one or more embodiments, artifact builder engine 206 may enable security configuration engine components (1501-2, 1504-N, 1601-M) executing on servers (1021-2, 1024-N) and data processing devices 1041-M to create individual environment definition(s) based on components of computing system 100 associated therewith; the aforementioned individual environment definition(s) may be compiled and collected as environment definition 214 through artifact builder engine 206. In some other embodiments, the aforementioned security configuration engine components may individually be associated with components of computing system 100 and may enable elements of environment definition 214 to be built therethrough. All reasonable variations are within the scope of the exemplary embodiments discussed herein.

In one or more embodiments, environment definition 214 may be written into a file or a set of instructions; the aforementioned file or set of instruction may be checked into a version control repository 222 (e.g., Git). In one or more embodiments, component baselines 216 discussed above may be predetermined attributes of the components of the resources discovered; the aforementioned predetermined attributes may serve as bases/references for change definitions. Additionally, in one or more embodiments, component security policies 218, which may either be defined through artifact builder engine 206 or collected therethrough, may be applied to environment definition 214 and component baselines 216 to provide security-based tracking mechanism in computing system 100; machine-readable component security policies 218 may enable selection of only a subset of components and component baselines 216 relevant to a specific scan for a given environment of computing system 100. In one or more embodiments, component metadata 220 may include metadata associated with components of the resources identified; the aforementioned metadata may be trace information for one or more components of the resources identified, update log (e.g., database schema updates) of the one or more components of the resources identified, specific version (e.g., operating system version) of the one or more components of the resources identified and so on. In one or more embodiments, component metadata 220 may be tracked to track deviations from component baselines 216. In one or more embodiments, component metadata 220 may be built based on component security policies 218 applied thereto. In some embodiments, artifact builder engine 206 may build component metadata 220 based on collection thereof in bits and pieces by security configuration engine components (1501-2, 1504-N, 1601-M) discussed above.

In one or more embodiments, version control repository 222 may be used to store component baselines 216, test code 224 (e.g., code to access security configurations of the target components and validate against baselines) and component metadata 220. Although version control repository 222 is shown as being part of security configuration engine 150, it should be noted that, in some embodiments, version control repository 222 may be distributed across computing system 100. In one or more embodiments, security configuration engine 150 may include a configuration policy scanner engine 226 configured to scan the resources identified by artifact builder engine 206, access security configurations thereof and validate the aforementioned security configurations against component baselines 216.

In one or more embodiments, the results of the scanning may be stored in a scan results repository 230, which, although is shown in FIG. 2 as part of security configuration engine 150, may be distributed across computing system 100. In one or more embodiments, visualization of the results of the scanning (e.g., stored in scan results repository 230) may be analyzed and visualized through an analytics and visualization engine 232 that is part of security configuration engine 150. In one or more embodiments, based on determination through analytics and visualization engine 232 of a security misconfiguration (e.g., a database schema modification, sensitive data leak from a custom application 210, a non-secure view of data in a database, an operating system vulnerability), a security configuration remediation engine 234 may remediate the determined security misconfiguration. FIG. 2 shows security misconfigurations 236 determined by analytics and visualization engine 232 therein.

Figure 3:
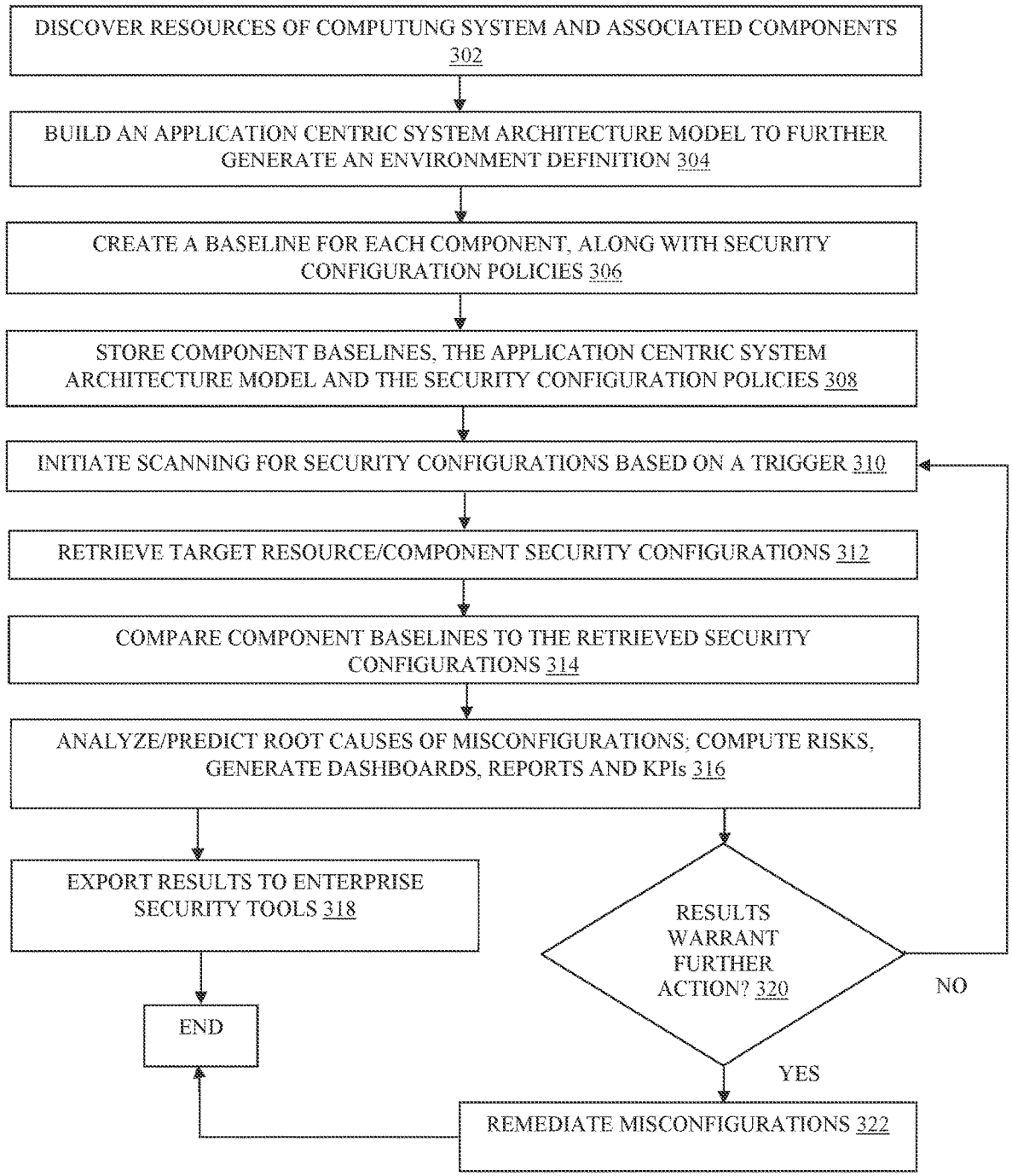
FIG. 3 is a conceptual flow diagram associated with operations pertinent to the security configuration engine of FIG. 1 and FIG. 2, according to one or more embodiments.

In one or more embodiments, the results of the scanning may be visualized through analytics and visualization engine 232 based on security configuration engine 150/security configuration engine components (1501-2, 1504-N, 1601-M) executing on servers 1021-N and data processing devices 1041-M (e.g., laptops, mobile devices) associated with enterprise security tools 238 (e.g., sets of instructions). It should be noted that the determination of security misconfigurations 236 and remediation thereof may be a periodic process, a continuous process or a process triggerable through a user (e.g., an administrator) of computing system 100. FIG. 3 shows a conceptual flow diagram associated with the operations discussed above with respect to security configuration engine 150, according to one or more embodiments. In one or more embodiments, operation 302 may involve identifying/discovering, through artifact builder engine 206, resources of computing system 100 such as physical resources (e.g., servers 1021-N, data processing devices 1041-M, edge computing devices discussed above), virtual resources (e.g., VMs), custom applications 210 and supporting resources/components including but not limited to databases and messaging systems.

In one or more embodiments, operation 304 may involve building, through artifact builder engine 206, an application centric system architecture model that specifies connections (e.g., data connections) between applications (e.g., custom applications 210) and supporting components including infrastructure and platform components (e.g., components of traditional, cloud and hybrid computing platforms 212) discussed above. In one or more embodiments, the application centric system architecture model may be a specification detailing an environment topology (e.g., environment topology 240 shown as part of environment definition 214; machine-readable environment definition 214 may encompass a universe of components of computing system 100 belonging to all layers of security including but not limited to connection details, custom applications 210 and data repositories) that includes the connections between the aforementioned applications and the supporting components; the environment topology may detail the configuration requirements of the components and the identified resources in a target deployment environment (e.g., development environment, integration environment, test environment, production environment) associated with computing system 100.

In one or more embodiments, artifact builder engine 206 may determine the boundary and components of environment topology 240 using threat modeling concepts including the security architecture of computing system 100 as applied to the (application centric) system architecture model discussed above; said security architecture may incorporate data flows, processes, data storage, requests, responses, trust boundaries and controls for securing components. In one or more embodiments, artifact builder engine 206 may discover components/resources of computing system 100 by querying metadata (e.g., tags for cloud resources including but not limited to computing machines, storage services, routers and firewalls) associated therewith. In one or more embodiments, the aforementioned discovery process may include retrieval of the connection information (e.g., Internet Protocol (IP) addresses, ports and protocols) from environment topology 240/environment definition 214 essential for collecting security configuration parameters of interest. In one or more embodiments, by combining the essential connection information with the relationships defined in the application centric system architectural model such as data flows, requests, responses, trust boundaries and security controls, machine-readable environment definition 214 may be created.

In one or more embodiments, operation 306 may involve creating, through artifact builder engine 206, a baseline for each of the components discussed above, along with security configuration policies (e.g., component security policies 218) that include the code (e.g., test code 224; FIG. 2 shows test code 224 as part of component security policies 218) to access security configurations of the target components and validate against the baselines; the created baselines may be component baselines 216; machine-readable component baselines 216 may be specific configuration parameters and allowable values thereof for each of the security controls of the components based on requirements of the target environment (e.g., information systems) of computing system 100. In one or more embodiments, operation 308 may involve storing the aforementioned component baselines 216, the application centric system architecture model (e.g., shown as application centric system architecture model 242 within version control repository 222) and component security policies 218 (or, security configuration policies) in version control repository 222 (e.g., Git). In one or more embodiments, operation 310 may involve initiating configuration policy scanner engine 226 based on a trigger (e.g., through a time-based trigger, an on-demand execution trigger, an event based trigger). For example, the trigger may be a change in any data (e.g., a violation of a component security policy 218) stored in version control repository 222.

In one or more embodiments, operation 312 may involve, in accordance with the initiation, configuration policy scanner engine 226 retrieving target resource security configurations based on executing the code (e.g., test code 224) in version control repository 222 therefor; the results of the retrieval may be stored in scan results repository 230. In one or more embodiments, operation 314 may involve configuration policy scanner engine 226 comparing component baselines 216 to the retrieved target resource configurations (e.g., stored in scan results repository 230); the aforementioned operation may involve validation of the retrieved target resource configurations. In one or more embodiments, operation 316 may involve analytics and visualization engine 232 analyzing and identifying/predicting root causes based on the determination (e.g., if a target resource configuration deviates from a corresponding component baseline 216) of the validation of the target resource configurations, and may provide risk computations, dashboards, reports and Key Performance Indicators (KPIs) in conjunction with enterprise security tools 238.

In one or more embodiments, operation 318 may involve exporting the results of analytics and visualization engine 232 to enterprise security tools 238 (e.g., enterprise Security Information and Event Management (SIEM) tools, enterprise reporting hubs). In one or more embodiments, operation 320 may involve determining whether the results of analytics and visualization engine 232 warrant further action. In one or more embodiments, if yes, operation 322 may involve security configuration remediation engine 234 remediating the deviated target resource configurations in accordance with component security policies 218 as the further action. In one or more embodiments, if no, control may pass onto operation 310 to repeat subsequent operations until there are no misconfigurations from a security perspective.

In some embodiments, the identification and/or prediction of root causes discussed above may be implemented in a machine learning environment. For example, remediation of a specific security misconfiguration (e.g., security misconfiguration 236) may involve a solution that may have been applied a number of times. In one or more embodiments, execution of one or more machine learning algorithms (e.g., machine learning algorithms 244 shown part of security configuration platform 150 in FIG. 2) may automatically determine the solution based on training thereof. In some implementations, a team of experts may train machine learning algorithms 244 in addition to previous solutions being stored in security configuration platform 150. All reasonable variations are within the scope of the exemplary embodiments discussed herein.

Figure 4:
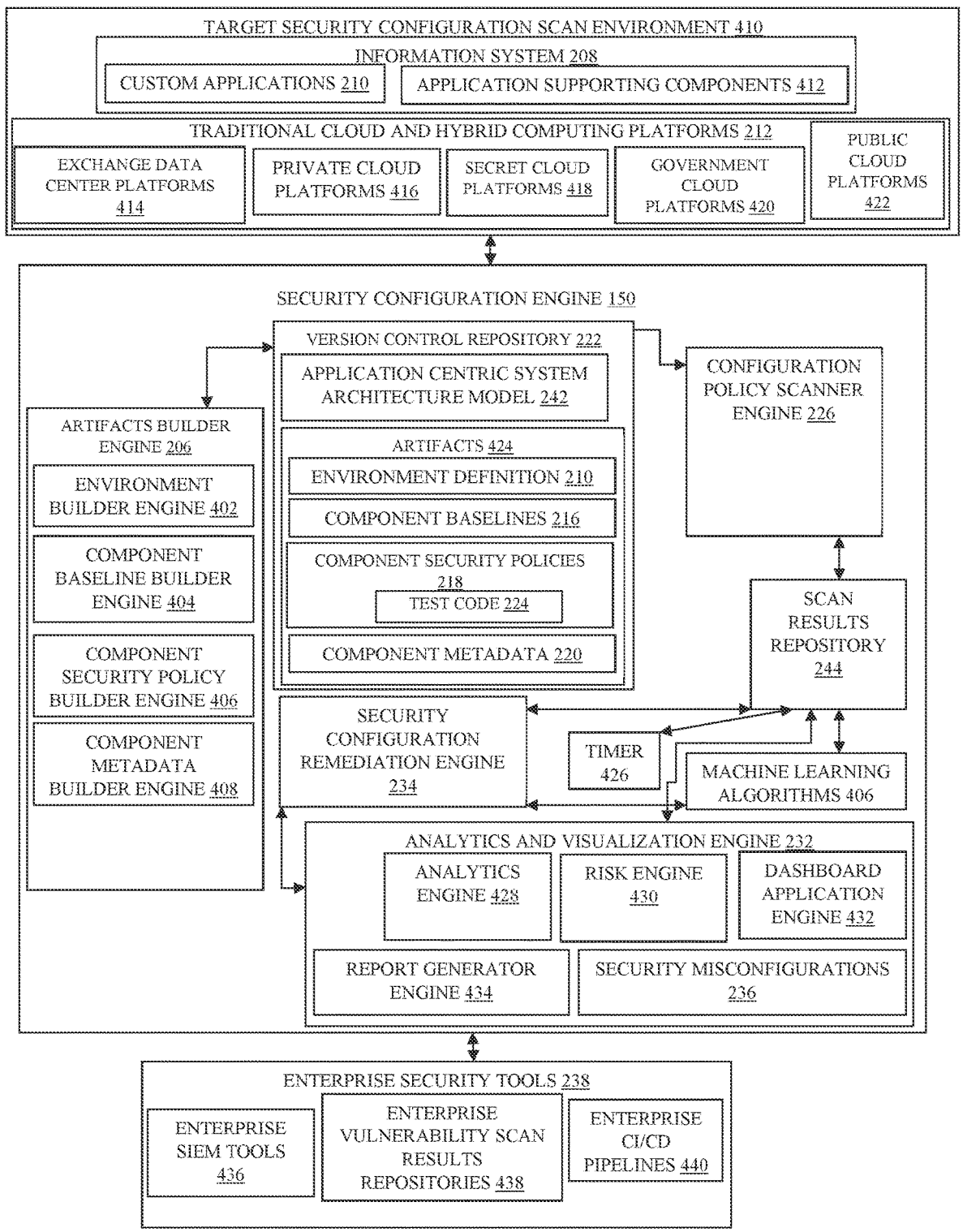
FIG. 4 is a more detailed conceptual architectural view of the security configuration engine of FIG. 1 and FIG. 2, according to one or more embodiments.

FIG. 4 shows the conceptual architecture of security configuration engine 150 in more detail, according to one or more embodiments. Here, in one or more embodiments, artifact builder engine 206 may include an environment builder engine 402, a component baseline builder engine 404, a component security policy builder engine 406 and a component metadata builder engine 408. In one or more embodiments, environment builder engine 402 may discover resources of computing system 100 in a target security configuration scan environment 410 (e.g., the target environment may be defined through test code 224, in one embodiment). In one or more embodiments, target security configuration scan environment 410 may include information system 208 including custom applications 210 and supporting components (e.g., application supporting components 412) thereof discussed above, and traditional, cloud and hybrid computing platforms 212. In one or more embodiments, traditional, cloud and hybrid computing platforms 212 may include but are not limited to on-premise data center platforms 414, private cloud platforms 416, secret cloud platforms 418, government cloud platforms 420 and public cloud platforms 422.

In one or more embodiments, the discovery of the resources (and associated components) by environment builder engine 402 may be through automatic and/or manual processes. In one or more embodiments, in accordance with the discovery, environment builder engine 402 may create environment definition 214 and store said created environment definition 214 in version control repository 222. In one or more embodiments, component baseline builder engine 404 may build baseline security configurations (e.g., component baselines 216) for the resources (and associated components) of target security configuration scan environment 410 in accordance with environment definition 214. In one or more embodiments, while component baselines 216 may primarily focus on security configurations, component baselines 216 may also include functional and performance configurations of computing system 100 as availability and reliability of critical and secure enterprise applications (e.g., custom applications 210) of computing system 100 may also be important.

In one or more embodiments, component security policy builder engine 406 may include instructions for accessing security configurations (e.g., of target security configuration scan environment 410) and validating against component baselines 216; component security policy builder engine 406 may also build component security policies 218 in accordance with environment definition 214. In one or more embodiments, component metadata builder engine 408 may build metadata about components of target security configuration scan environment 410 (or, computing system 100); said metadata may include types of data, business context of individual components and, as discussed above, trace information for one or more components of the resources identified, update log (e.g., database schema updates) of the one or more components of the resources identified, specific version (e.g., operating system version). Other types of metadata are within the scope of the exemplary embodiments discussed herein.

The abovementioned artifacts (e.g., artifacts 424) generated by artifact builder engine 206 may be stored in version control repository 222; version control repository 222 is shown in FIG. 4 as including artifacts 424 (e.g., environment definition 214, component baselines 216, component security policies 218, component metadata 220 discussed above); machine-readable component metadata 220 may add to the environment definition (e.g., part of environment definition 214) of each of the components of the environment of computing system 100 not only the business context but also technical and operational contexts. In one or more embodiments, configuration policy scanner engine 226 may access version control repository 222 to execute test code 224 to scan target security configuration scan environment 410, access/retrieve the target security configurations in accordance with specification thereof in environment definition 214 and store the aforementioned accessed/retrieved target security configurations in scan results repository 230. In one or more embodiments, the aforementioned scanning by configuration policy scanner engine 226 may be triggered through, say, a timer 426 (e.g., hardware circuitry controllable through software) or through other means discussed above; the triggering may result based on tracking component metadata 220.

In one or more embodiments, the results of the scanning may be analyzed through analytics and visualization engine 232. FIG. 4 shows analytics and visualization engine 232 as including an analytics engine 428, a risk engine 430, a dashboard application engine 432 and a report generator engine 434. In one or more embodiments, analytics and visualization engine 232 may also be interfaced with machine learning algorithms 244 discussed above. In one or more embodiments, analytics engine 428 may analyze the results of the scanning to identify anomalies and root causes of the security misconfigurations (e.g., security misconfigurations 236) discussed above. In one or more embodiments, machine learning algorithms 244 may incorporate a set of models to retrieve the results of the scanning to predict the root causes of the anomalies/security misconfigurations in cases where detection thereof is not possible through deterministic analytical tools. In one or more embodiments risk engine 430 may, from the retrieved results of the scanning, compute risks based on the impact of the security misconfigurations utilizing component metadata 220 (e.g., that considers the business context).

In one or more embodiments, dashboard application engine 432 may display KPIs and other tabular and/or graphical visualizations of validation tests associated with the security configurations. In one or more embodiments, report generator engine 434 may, from the abovementioned retrieved results of the scanning, generate reports in multiple formats (e.g., Portable Document Format (PDF), Comma-Separated Values (CSV), JavaScript Object Notation (JSON)) for human and/or machine consumption. In one or more embodiments, the retrieved results of scanning (or, analytics and visualization engine 232) may be exported to enterprise security tools 238 discussed above; FIG. 4 shows enterprise security tools 238 as including enterprise SIEM tools 436, enterprise vulnerability scan results repositories 438 and enterprise Continuous Integration/Continuous Delivery (CI/CD) pipelines 440. In one or more embodiments, enterprise vulnerability scan results repositories 438 may include the results of scanning for security vulnerabilities via analytics and visualization engine 232. In one or more embodiments, enterprise CI/CD pipelines 440 may enable automating software delivery processes, including combining code changes in a central repository and deploying to desired environments; the aforementioned scans may be integrated with enterprise CI/CD pipelines 440.

FIG. 4 also shows security configuration remediation engine 234 configured to remediate deviated security configurations in accordance with component security policies 218 discussed above. In one or more embodiments, the results of analytics and visualization engine 232 and the generated artifacts discussed above may be accessed through end user devices such as laptops and mobile devices (example data processing devices 104 1-M). It should also be noted that enterprise security tools 238 may also be executed on one or more servers 102 1-N and one or more data processing devices 104 1-M.

Figure 5:
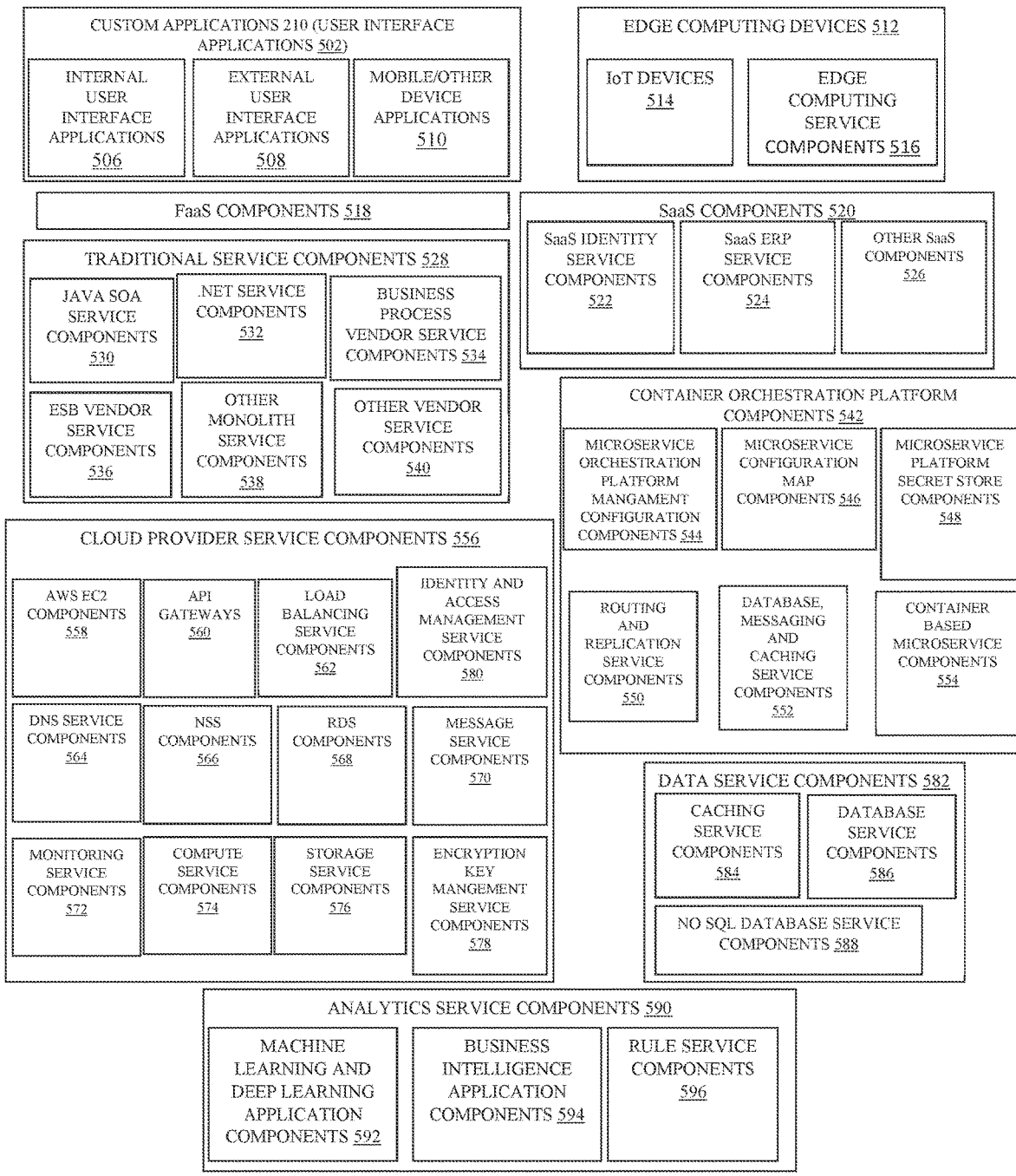
FIG. 5 is a schematic view of components of an example computing system for which security misconfigurations are configured to be detected.

FIG. 5 shows components 500 of an example computing system 100 for which security misconfigurations are configured to be detected in accordance with the operations/processes discussed above. Components 500 for which security configurations are configured to be scanned include user interface applications 502 that incorporate Graphical User Interfaces (GUIs) to interact with human users 504 (e.g., on data processing devices 104 1-M). In one or more embodiments, user interface applications 502 may be regarded as part of custom applications 210. As shown in FIG. 5, user interface applications 502 may include internal user interface applications 506 (e.g., relevant to users within an organization on, say, one or more data processing devices 104 1-M), external user interface applications 508 (e.g., relevant to customers of the organization on, say, one or more data processing devices 104 1-M) and mobile/other device applications 510 (e.g., again, on one or more data processing devices 104 1-M).

In one or more embodiments, components 500 may also include edge computing devices 512 such as IoT devices 514 (e.g., IoT sensors, IoT gateways) and edge computing service components 516 (e.g., associated with edge computing services associated with computing system 100), function as a service (FaaS) components 518 such as Amazon® Web Services (AWS) Lambda-based applications, and SaaS components 520. FaaS may represent cloud computing services that enable management of application functionalities without the requirements of building and maintaining infrastructure associated therewith. As shown in FIG. 5, SaaS components 520 may include SaaS identity service components 522 (e.g., Okta®, Amazon® Cognito), SaaS Enterprise Resource Planning (ERP) service components 524 (e.g., Salesforce® ERP) and other SaaS components 526.

Further, components 500 may include traditional service components 528 including JAVA Service Oriented Architecture (SOA) service components 530, .NET service components 532 (e.g., .NET application service components), business process vendor service components 534 (e.g., business process flow application service components), Enterprise Service Bus (ESB) vendor service components 536, other monolith service components 538 (e.g., J2EE application service components) and other vendor service components 540. Still further, components 500 may include container orchestration platform components 542 that include microservice orchestration platform management configuration components 544, microservice configuration map components 546, microservice platform secret store components 548, routing and replication service components 550, database, messaging and caching service components 552 and container based microservice components 554 pertinent to container based microservices (e.g., OpenShift® based, AWS Elastic Kubernetes Service (EKS) based, AWS Elastic Container Service (ECS) based) hosted on container orchestration platforms.

Components 500 may further include cloud provider service components 556 that cover IaaS components and PaaS components. Examples may include but are not limited to AWS Elastic Compute Cloud (EC2) components 558, API gateways 560, load balancing service components 562, Domain Name System (DNS) service components 564, Network Security Service (NSS) components 566 such as AWS Virtual Private Clouds (VPCs) and AWS subnets, Relational Database Service (RDS) components 568 such as AWS RDS, messaging service components 570 such as AWS Simple Queue Service (SQS) and AWS Simple Notification Service (SNS), monitoring service components 572 such as AWS CloudTrail and AWS CloudWatch, compute service components 574, storage service components 576 such as AWS Simple Storage Service (S3) and AWS Elastic File System (EFS), encryption key management service components 578 such as AWS Key Management Service (KMS), and Identity and Access Management Service Components 580 such as AWS Identity and Access Management (IAM) and Amazon® Cognito.

Components 500 may still further include data service components 582 that include caching service components 584 such as Amazon® ElastiCache (e.g., for Redis) and Amazon® Elasticsearch service (ES), Structured Query Language (SQL) database service components 586 and No SQL database service components 588 such as Amazon® DynamoDB and MongoDB, and analytics service components 590 such as Machine Learning and Deep Learning application components 592, business intelligence application components 594 and rule service components 596 (e.g., Apache Spark based applications/application components). Other types are within the scope of the exemplary embodiments discussed herein.

Figure 6:
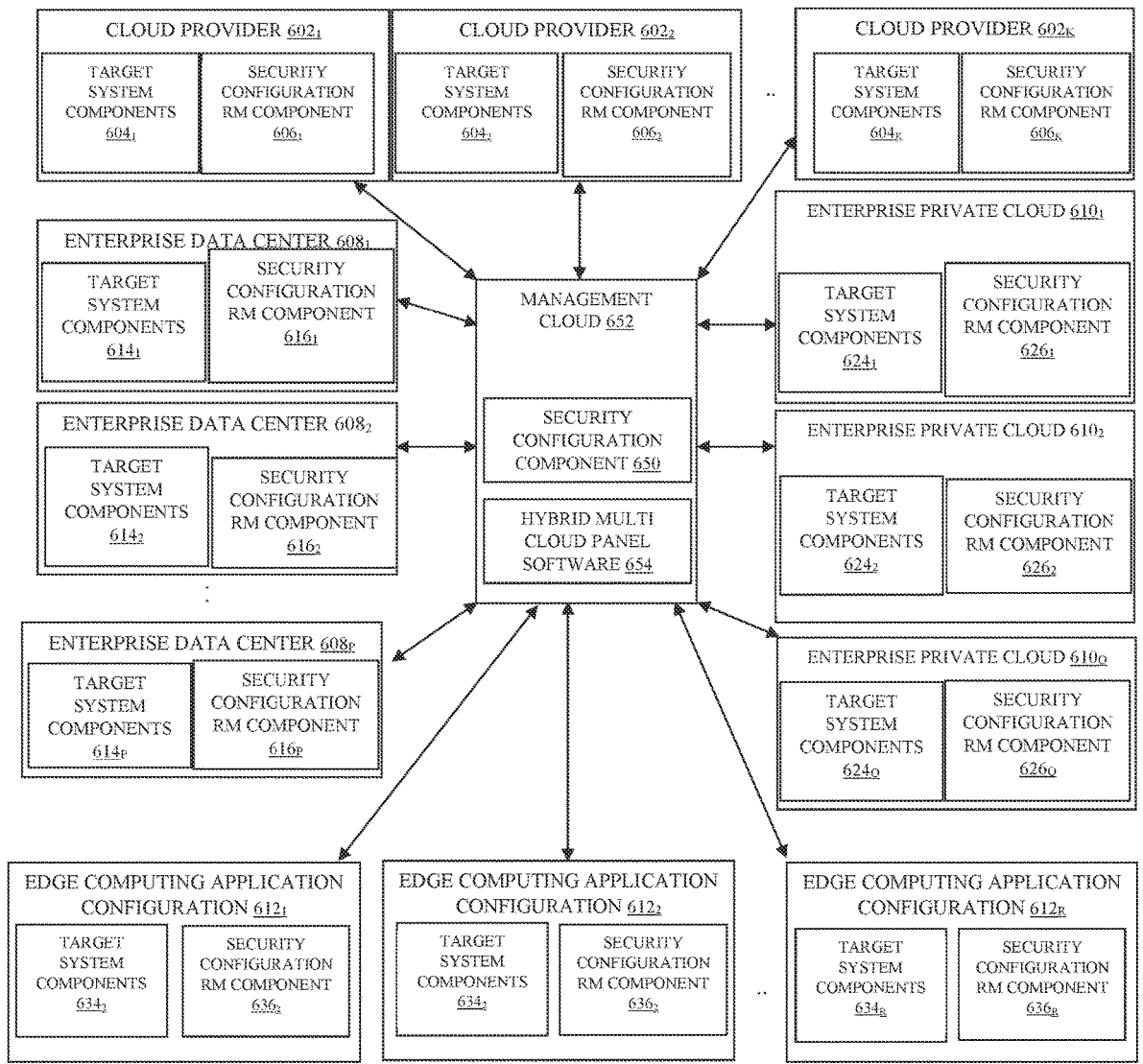
FIG. 6 is a schematic view of an example distributed deployment configuration of a security configuration engine in accordance with a target security configuration scan environment being distributed across multiple clouds, data centers and computing services.

FIG. 6 shows an example distributed deployment configuration of security configuration engine 150 in accordance with target security configuration scan environment 410 being distributed across multiple clouds. With hosting of enterprise applications becoming more distributed with time, computing system 100 may be envisioned to be geographically distributed across multiple cloud providers, on-premise data centers and edge computing devices. In one or more embodiments, the architecture of security configuration engine 150 may be conducive to scanning applications (e.g., custom applications 210) distributed across multiple cloud providers, on-premise data centers and edge computing devices.

In accordance therewith, applications and associated components (e.g., components 500) to be scanned may be hosted on a number of cloud providers 602₁-K. FIG. 6 shows each cloud provider 602₁-K having corresponding target system components 604₁-K. In addition, in a zone of each cloud provider 602₁-K, a security configuration regional manager (RM) component 606₁-K (analogous to security configuration engine components 150₁-2, 150₄-N, 160₁-M) may execute to take the responsibility of performing scans discussed above, storing results thereof and sharing relevant information within the scope of a boundary thereof. A security configuration RM component (e.g., security configuration RM component 616₁-P) may also be scoped to cover target system components 614₁-P hosted in each of a number of enterprise data centers 608₁-P.

FIG. 6 shows security configuration component 650 (analogous to security configuration engine 150) executing on a management cloud 652 (in accordance with distribution thereof across computing system 100, management cloud 652 may be considered to be distributed across servers 102₁-N and/or data processing devices 104₁-M). FIG. 6 also shows enterprise private clouds 610₁-Q and edge computing application configurations 612₁-R as including corresponding target system components 624₁-Q and target system components 634₁-R respectively. Again, security configuration RM components 626₁-Q and security configuration RM components 636₁-R may be part of enterprise private clouds 610₁-Q and edge computing application configurations 612₁-R respectively.

Security configuration component 650 may coordinate with security configuration RM components (606₁-K, 616₁-P, 626₁-Q and 636₁-R) to delegate work thereto. Management cloud 652 may include a hybrid multi cloud panel software 654 that provides a single panel of control for provisioning and administering resources hosted on multiple clouds. Hybrid multi cloud panel software 654 may be interfaced with security configuration component 650. Edge computing application configurations 612₁-R may include IoT devices (e.g., in industrial plants, home appliances) and gateways, autonomous vehicular control applications (e.g., self-driving cars, trucks, airplanes, ships, drones), CDNs capable of hosting computing applications for personalization of content using, say, Lambda functions in AWS CDNs, remote medicine instruments that require several applications to be deployed along with medical equipment, and implanted medical devices with associated software applications.

Traditionally, details related to a computing system may be documented and data stored in silos based on the intended audience for the data or the details. Software developers may have a logical view of applications, data, requests and responses thereof. However, trust boundaries and security controls may not have been implemented for the applications. While diagrams about network component details such as VPC, subnets, routers, router tables and Network Address Translation (NAT) instances may be available, details of the applications, types of data stored and security controls for application layers may not be fully understood. DevOps teams associated with the computing system may possess deployment, installation and connection information between applications including High Availability and Resiliency requirements. However, the rest of the information discussed may not be available thereto.

In another case of operations in silos, within an information security team within the traditional computing system, security operation centers may possess monitoring related information but not information pertinent to actual applications, networks etc. Information security threat modeling personnel may typically possess logical diagrams of applications, requests, responses and trust boundaries but may not possess information about networks, infrastructure components, connection details etc. Exemplary embodiments discussed herein solve the problems associated with operating in silos through security configuration engine 150 and security configuration engine components (1501-2, 1504-N and 1601-M).

Specifically, environment definition 214 discussed above may combine information relevant to test security configurations pertinent to all components from all layers of the multi-layered software architecture model of computing system 100 including network infrastructure, applications and platform services. Typically, components of a computing system at one central location may have connection details thereof available immediately. However, in the case of there being several components of the computing system outside the central location, inefficiencies may ensue because of some components, controls and/or data flow related configurations possibly being unnoticed and not monitored, leading to security misconfigurations and vulnerabilities. The aforementioned problem may be solved through computing system 100 discussed above. In one or more embodiments, environment topology 240 (shown as part of environment definition 214) may be a machine-readable file that includes components of interest along with connection information for data flow therebetween.

In one or more embodiments, component baselines 216 discussed above may include configuration items that define attribute names and expected values. In one or more embodiments, the aforementioned expected values may be derived based on application specific requirements, organizational policies and standards and/or industry benchmarks (e.g., Center for Internet Security (CIS) based). However, in one or more embodiments, component baselines 216 may not be built solely based on industry benchmarks and general organizational standards; component baselines 216 may incorporate data flows, user access patterns and configurations required to satisfy compliance standards (e.g., National Institute of Standards and Technology (NIST) 800-53). In one or more embodiments, component baselines 216 may incorporate specific requirements of custom applications 210 and security configuration requirements thereof, as well as other supporting components part of environment definition 214. In addition, as seen above, component baselines 216 may incorporate functional and performance configurations pertinent to "availability" and "reliability" of computing system 100.

The abovementioned custom application configurations may include name value pairs of a parameter and value thereof specific to an application and an environment in which the application is deployed. However, in a typical setup, allowable values for the configuration parameters may be known only to Subject Matter Experts (SMEs) within a computing system; alternatively, said allowable values may be stored in baseline documents (e.g., in Microsoft® Word format, Microsoft® Excel format) within a repository. This may lead to inefficiencies due to lack of ready availability for machine consumption. In case of there being a security incident, identification of the root cause of a security misconfiguration associated therewith and remediation of said security misconfiguration may take a long time. Exemplary embodiments discussed herein solve the aforementioned problems by enabling maintenance of a central repository (e.g., version control repository 222) for allowable configuration parameters and values pertinent to computing system 100.

In modern computing systems, there may be hundreds of custom applications, with thousands of custom configurations of importance from a security perspective. With proliferation of the number of configurations, it may be extremely difficult to understand the abovementioned allowable values easily. In one or more embodiments, the abovementioned maintenance of a centralized repository that can scale to hundreds of thousands of allowable configuration values specific to computing system 100 in a specific environment may increase efficiency of security compliance and accuracy of security compliance solutions. In one or more embodiments, the aforementioned may be enabled through collection of the allowable configuration values specific to computing system 100 in the specific environment in one central location in machine-readable format.

In one or more embodiments, artifact builder engine 206 (or, specifically, component security policy builder engine 406) may generate policies (e.g., component security policies 218) that specify the configurations to be verified; the aforementioned specification may serve as an input to test code 224 that is configured to compare actual values of the configurations to baseline values (e.g., component baselines 216). In one or more embodiments, depending on the environment and phase of the validation testing (e.g., security validation testing), validation of solely a subset of the configurations may be made possible. Thus, in one or more embodiments, the policies (e.g., component security policies 218) may enable selection of the subset of the configurations that is contextually relevant to a current set of validation scenarios. In one or more embodiments, having the ability to customize the validations based on testing needs may further improve timeliness of the validation and keep the focus on validation tests that are of importance.

In one or more embodiments, artifact builder engine 206 (or, specifically, component metadata builder engine 408) may create metadata (e.g., component metadata 220) of the components specified in the environment of computing system 100. In one or more embodiments, component metadata 220 may be intended to understand the context of a security misconfiguration and impact thereof. In one implementation, component metadata 220 may include an identifier of the component, component name, user type (e.g., internal, external), data classification (e.g., Confidential, Sensitive, Personally Identifiable Information (PII) and data domain (e.g., Financial, Customer)). In one or more embodiments, associating the components (e.g., components 500) and configurations with component metadata 220 in context of business usage thereof may be powerful. In typical implementations, whenever a misconfiguration is identified during manual audits, the business context of components and how the configurations protect the components may have to be interpreted by security personnel. However, in one or more embodiments, the association of component metadata 220 discussed herein may make the impact of a misconfiguration and importance thereof to business immediately available.

To summarize, in one or more embodiments, artifact builder engine 206 (or, specifically, component metadata builder engine 408) may enable association of business context(s) to the components and the configurations to further enable improvement of interpretation of the impact (s) of the misconfigurations and to bring forthwith the importance of fixing issues. In one or more embodiments, as discussed above, security configuration engine 150 may include version control repository 222 therein (or associated therewith) to enable storing and retrieval of environment definition 214, component baselines 216, component security policies 218 and component metadata 220. In one or more embodiments, the versioning of the above artifacts (e.g., artifacts 424) may provide a capability to understand temporal drifts therein. In other words, in one or more embodiments, versioning allowable values specified in component baselines 216, environment definition 214 and component metadata 220 may enable identification of root causes of problems faster.

For example, the versioned artifacts discussed above may be checked to see if any changes were made to data therein in case scan results indicate current failure of a validation test that was passed only recently. Solutions based on root cause analyses, thereby, may be expedited. In one or more embodiments, as discussed above, configuration policy scanner engine 226 may execute instructions to access and retrieve configuration parameters defined in component baselines 216. In one or more embodiments, component baselines 216 may have configuration parameters for components identified as relevant through threat modeling that results in validations not merely based on generic best practices but also based on fine-grained specificity to the system under validation. Typical vulnerability scanning solutions do not focus on specific configuration requirements for a system based on business requirements thereof and threat modeling, and custom applications having unique set of configuration parameters and values. Thus, in one or more embodiments, the ability of configuration policy scanner engine 226 to retrieve configuration parameters along with values thereof and to compare with specific component baselines 216 may provide for a highly accurate and future-proof security configuration validation solution consonant with modern and emerging application requirements.

In one or more embodiments, the ability to scale to thousands of configuration parameters within a short time (e.g., few minutes) may make it possible to track security configurations and the resulting security postures in computing system 100 efficiently and continuously. In one or more embodiments, scan results repository 230 may store (e.g., in a database) results of the scans discussed above. In one or more embodiments, scan results repository 230 may include details of each scan that facilitates a mechanism for retrieving results, creating dashboards and developing machine learning models discussed above. In one or more embodiments, storing results of the scans discussed above with the associated environment definition (e.g., environment definition 214), component baselines 216 and component metadata 220 may enable visualization of results, in addition to comparison thereof with results from different time periods. In one or more embodiments, the aforementioned comparison may be useful in tracking the drift in configurations across two different times. In one or more embodiments, as the results may include configuration validations about custom applications 210, searching and retrieving of the results through scan results repository 230 may further improve analyses of the results and enable expeditious root cause analyses of security misconfigurations.

In one or more embodiments, security configuration engine 150, as discussed above, may include scan security configurations of components hosted on edge computing devices (e.g., IoT devices/sensors, IoT gateways). While security control of IoT devices is slowly becoming important, a comprehensive automatic security compliance validation solution including IoT sensors and associated components (e.g., IoT gateways) thereof in typical implementations is lacking, which may be remedied through security configuration engine 150 discussed above. Additionally, exemplary embodiments provide for scan security configurations of personal health applications on personal computing devices such as mobile phones, remote medicine applications, implanted devices such as pacemakers, applications hosted on airplanes and drones and/or backend applications thereof and/or information systems with emerging technology components. Exemplary embodiments discussed herein may enable continuous monitoring of application security configurations of components discussed herein and identification of security misconfigurations in near real-time.

Exemplary embodiments discussed herein may further include scan security configurations of systems distributed on multiple clouds (e.g., Microsoft® Azure, Google® Cloud Platform, AWS, IBM® Cloud and Oracle® Cloud). The aforementioned cloud infrastructures may encompass public, private, secret and government clouds. The boundaries of the aforementioned systems may now encompass clouds including a number of data centers spread over the world. As organizations are spreading systems across infrastructures, platforms and applications of multiple cloud providers, the ensuing multi-cloud environment may have more moving parts that increase a surface area of exposure to vulnerabilities. Exemplary embodiments discussed herein may enable keeping track of all security configurations related to a multi-cloud computing system 100, allowable values thereof, configured values thereof and any security misconfigurations therein in near real-time. Again, in one or more embodiments, the threat modeling discussed above may enable identification of potential threat vectors, trust boundaries and data flows to enable optimal identification of the components (e.g., components 500) and the configurations of interest to be validated.

Again, exemplary embodiments discussed herein may not only extend to multi-cloud environments but also may cover traditional data centers as well as hybrid environments. In existing implementations, vulnerability scanning does not take into account application specific requirements and does not provide a holistic view of requirements and configurations of information systems within a computing system; instead, typical implementations of vulnerability scanning focus on generic industry benchmarks and best practices. Exemplary embodiments discussed herein may further encompass scanning across components built using legacy technology and modern architectures including container-based technologies and/or server-less computing functions. The architecture and design of computing system 100 discussed herein may not be limited to custom applications 210 that are deployed using traditional architecture (e.g., bare metal computing machines) but may also include VMs, PaaS, FaaS and SaaS. The possible thousands of custom services may lead to proliferation of security configurations. Again, the threat-modeling based identification of components, data flows and trust boundaries may help identify all security configurations of interest and importance and scan the aforementioned security configurations continuously to keep computing system 100 always security-compliant.

Exemplary embodiments discussed herein may further take into account vulnerabilities associated with security configurations of applications that are correlated with vulnerabilities of components described in an environment including databases, data at rest, data at motion, vendor products such as application servers, caching services, messaging services and cloud resources such as object stores and streaming services. Also, exemplary embodiments discussed herein may further correlate security configuration of custom applications 210 with other vulnerabilities detected at a network layer, an infrastructure layer or a platform layer of the multi-layered software architecture model of computing system 100 to understand the composite effect of vulnerabilities that occur at various layers. Security configuration engine 150 discussed above may ingest vulnerability scan results from other vendors that complement findings thereof. The correlation of vulnerabilities may enable finding patterns where two single independent vulnerabilities can increase likelihood of exploitation thereof by an adversary. In one or more embodiments, the aforementioned feature may further increase accuracy of prediction of the likelihood of exploitation of vulnerabilities and may be very helpful in prioritizing solving problems (the remediation process discussed above) associated with security misconfiguration failures.

Exemplary embodiments discussed herein may enable a side-by-side comparison of configurations across two different environments; highlights and root cause analyses of failures thereacross may also be enabled. This is in addition to enabling the side-by-side comparison of configurations between two different scans of the same environment. During software development or maintenance, it is a common practice to have multiple development, integration testing, performance, user acceptance testing (UAT) and production environments. In case of government agencies and other regulated industries such as finance and healthcare, it is essential for security personnel to approve use of new environments that are provisioned. In addition, the aforementioned security personnel are involved in ensuring that the environments are in compliance with pre-negotiated security controls. Typically, security configurations of custom applications and related components thereof may be verified manually. Exemplary embodiments discussed herein may enable comparison of security configurations between two different scans of the same environment of computing system 100 and allow security personnel to approve continuation of use of the environment. In one or more embodiments, comparison of two different environments including one that is previously approved and another that is new may expedite the approval process.

Typical implementations involving spot checks may not cover all potential vulnerabilities and may be time-consuming. Across modern architecture-based applications and cloud environments with thousands of configurations changing constantly, exemplary embodiments provide for unique improvement of the Authority to Operate (ATO) process for Designated Approving Authorities (DAAs) and procurement of compliance audits completed for financial and other regulated industries. Exemplary embodiments may eliminate blind spots associated with traditional spot checks by providing the capability to compare two scans from same or different environments. Exemplary embodiments may also enable import of security vulnerability findings from other scans related to infrastructure, static and dynamic code analyses and networks using other vendor products, correlation of vulnerabilities associated with same or related resources to understand the potential for chained vulnerability exploitation, procurement of key performance metrics of scan results, visualization of baselines, trends and differences between different versions of the same or different resources, scanning of results mapped to standards such as NIST 800-53 for all resources associated with the environment, scanning results mapped to cyber-security framework functional areas, and scanning results combined with cyber-security risk frameworks to compute risk levels of vulnerabilities.

The abovementioned features may be helpful in visualizing and analyzing security configuration scan results, lists of components that include environment(s) for an information system, data flows, security controls, and metadata. Standard KPIs, charts, historical trends etc., along with the root cause analyses, may help a human analyst narrow down misconfiguration issues of custom applications 210 and associated components thereof. Exemplary embodiments may also provide for anomaly detection and root cause analyses of misconfigurations based on historical scan results using machine learning and deep learning models. Summary and analyses of thousands of components along with hundreds of thousands of configurations through normal visualization and dashboards may not be efficient. In addition, in one or more embodiments, incorporation of machine learning and Artificial Intelligence (AI) technologies within computing system may enable prediction of potential issues to be encountered when a new environment is provisioned and all applications are deployed and configured therewith.

In one or more embodiments, the results of a scan may be analyzed initially through a machine learning/AI model to predict the root cause of misconfiguration failures. Exemplary embodiments enable achievement thereof through saving the root causes in machine-readable format in a repository (e.g., distributed across memories 204 1-N). Initially, a human may be classifying the root causes of the misconfigurations; once enough training data is available, machine learning models (e.g., incorporated in machine learning algorithms 244) may be developed. The trained machine learning models may then start classifying root causes of misconfigurations instead of humans. Exemplary embodiments discussed herein may further enable remediation of security misconfigurations using configuration management tools such as Chef, Puppet and Ansible; custom scripts for configuration management may also be compatible with security configuration engine 150. Configuration management tools such as Chef, Puppet and Ansible may include automated scripts to install, configure and update changes to any software including custom software. When a root cause of a misconfiguration is straight forward and when the remediation is well understood, in one or more embodiments, security configuration engine 150 (specifically, security configuration remediation engine 234) may programmatically invoke configuration management scripts such as Chef recipes and Ansible playbooks. Once the problem is fixed, in one or more embodiments, security configuration remediation engine 234 may rescan the environment (e.g., target security configuration scan environment 410) and the processes may be continued until all the issues associated with security misconfigurations are fixed completely.

Figure 7:
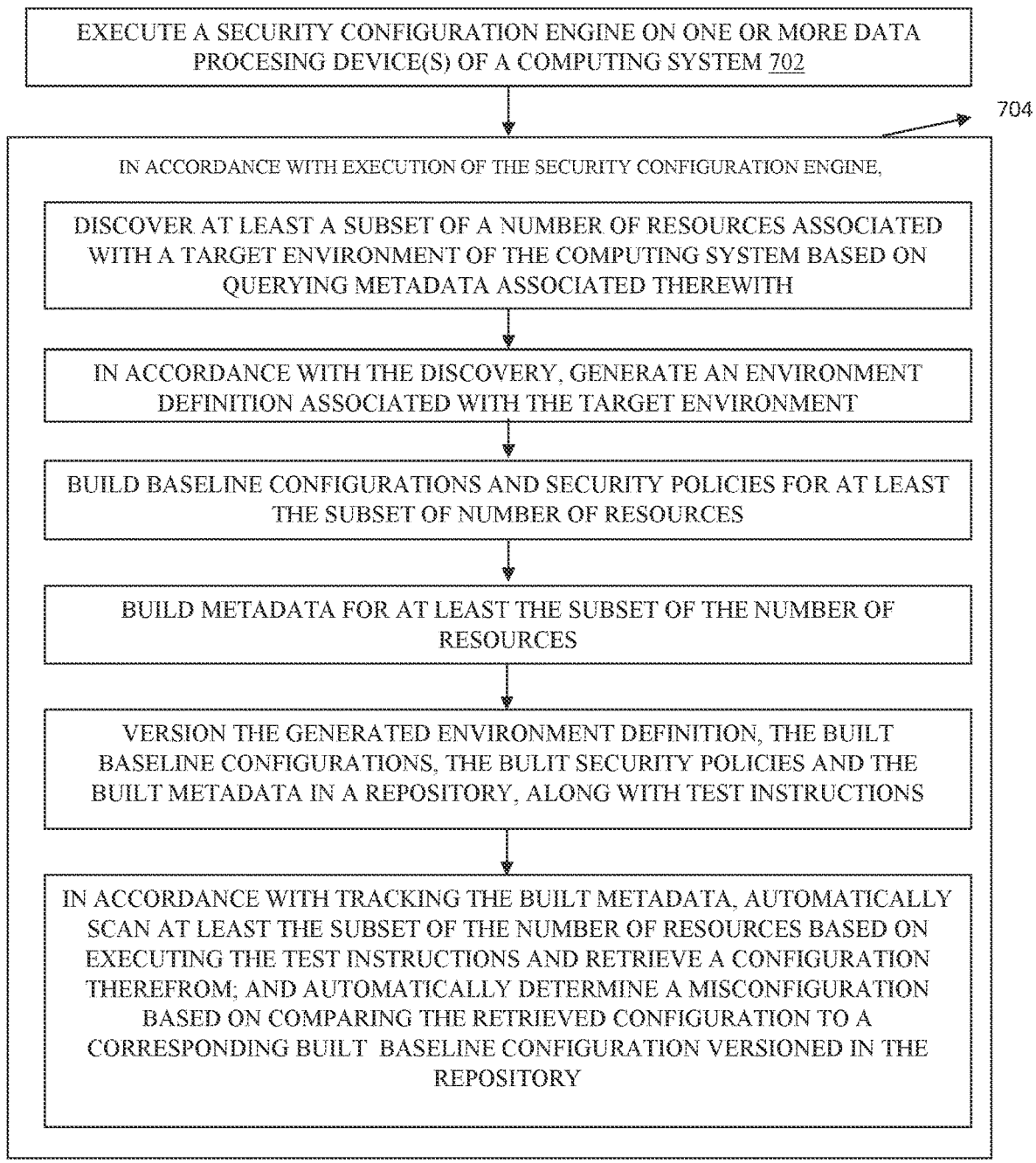
FIG. 7 is a process flow diagram detailing the operations involved in efficient security configuration compliance verification of resources in a target environment of a computing system, according to one or more embodiments.

Thus, exemplary embodiments provide for near real-time automatic remediation triggered through security configuration engine 150 after establishment of the root cause of a security misconfiguration in computing system 100. All of the abovementioned advantages provide for increased availability, reliability, confidentiality, integrity and non-repudiation of computing system 100. FIG. 7 shows a process flow diagram detailing the operations involved in efficient security configuration compliance verification of resources (e.g., components 500, servers 102 1-N, data processing devices 104 1-M) in a target environment (e.g., target security configuration scan environment 410) of a computing system (e.g., computing system 100), according to one or more embodiments. In one or more embodiments, operation 702 may involve executing a security configuration engine (e.g., security configuration engine 150, security configuration engine components 1501-2, 1504-N, 1601-M) on one or more data processing device(s) (e.g., servers 1021-N, data processing devices 1041-M) of the computing system. In one or more embodiments, the computing system may include a number of resources across a computer network (e.g., computer network 106). In one or more embodiments, the number of resources may include a number of data processing devices including the one or more processing device(s) and components associated therewith executing across the number of data processing devices.

In one or more embodiments, operation 704 may involve, in accordance with an execution of the security configuration engine, discovering at least a subset of the number of resources that is associated with the target environment of the computing system based on querying a first metadata associated with the number of resources in the target environment, and, in accordance with a discovery, generating an environment definition (e.g., environment definition 214) associated with the target environment based on combining information relevant to test security configurations pertinent to all resources corresponding to at least the subset of the number of resources from all layers of a multi-layered system security architectural model (e.g., application centric system architecture model 242) of the target environment.

In one or more embodiments, the multi-layered system security architectural model may specify connections across all the resources corresponding to at least the subset of the number of resources, and the environment definition may specify configuration requirements of at least the subset of the number of resources in the target environment.

In one or more embodiments, operation 704 may also involve, in accordance with the execution of the security configuration engine, building a baseline configuration (e.g., component baselines 216) and a security policy (e.g., component security policies 218) for at least the subset of the number of resources in accordance with the environment definition, and building a second metadata (e.g., component metadata 220) for at least subset of the number of resources in accordance with the security policy. In one or more embodiments, the second metadata may provide a number of contexts to the environment definition. In one or more embodiments, operation 704 may further involve, in accordance with the execution of the security configuration engine, versioning the environment definition, the baseline configuration, the security policy and the second metadata in a repository (e.g., version control repository 222) of the computing system, along with a test instruction (e.g., test code 224) pertinent to scanning the target environment for configurations, and, in accordance with tracking the second metadata versioned in the repository, automatically scanning at least the subset of the number of resources in accordance with the environment definition based on executing the test instruction and retrieving a specific configuration therefrom based on the scanning, and automatically determining a misconfiguration (e.g., security misconfiguration 236) based on comparing the specific configuration to a corresponding baseline configuration versioned in the repository.

Additionally, in some embodiments, operation 704 (not shown in FIG. 7) may involve verifying that a sequence of configurations is correctly defined based on retrieving another specific configuration. Again, as discussed above, while the figures are specifically directed to security configurations (e.g., security configuration verification) and remediation of security misconfigurations, it should be noted that concepts discussed herein may also be applicable to functional and non-functional configurations, functional and non-functional configuration verification and functional and non-functional misconfiguration remediation. It should be obvious that security configuration engine 150 may be understood as a specific example of a generic configuration engine (e.g., a functional configuration engine and/or a non-functional configuration engine may be other examples) and that security policies and other security related elements may be specific examples of generic policies and elements that may encompass functional and non-functional policies associated with computing system 100. Also, the multi-layer system security architectural model may be a mere specific example of a multi-layer system architectural model. All reasonable variations are within the scope of the exemplary embodiments discussed herein.

Further, instructions associated with security configuration engine 150, security configuration engine components 1501-2, 1504-N, 1601-M, and components discussed with reference to FIG. 6 may be tangibly embodied on a non-transitory medium (e.g., a Compact Disc (CD), a Digital Video Disc (DVD), a Blu-ray Disc®, a hard disk/drive), readable through a data processing device (e.g., a server 1021-N, a data processing device 1041-M) and executable therethrough. All reasonable variations are within the scope of the exemplary embodiments discussed herein.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., a server 1021-N, a data processing device 1041-M). Accordingly, the specification and drawings are to be regarded in an illustrative rather than a restrictive sense.

What is claimed is:

1. A method comprising:
   automatically determining, in a system within an organization, a misconfiguration by comparing a specific configuration of a target environment to a corresponding baseline configuration;
   automatically identifying, in the system within the organization, a configuration change in at least a subset of a plurality of resources, wherein the configuration change is due to a cyber-attack and comprises the misconfiguration;
   automatically detecting, in the system within the organization, a non-compliance with respect to at least one of a change management policy, an organizational policy, a standard, and a procedure;
   automatically scanning at least the subset of the plurality of resources, in accordance with an environment definition based on executing a test instruction pertinent to scanning the target environment for configurations and retrieving the specific configuration therefrom based on the scanning, wherein automatically scanning at least the subset of the plurality of resources comprises invoking the scanning in at least the subset of the plurality of resources in at least one stage of a software development prior to deployment of at least the subset of the plurality of resources to a production environment;

identifying the misconfiguration in the at least one stage of the software development at one of before and during the deployment to the production environment; and remediating the misconfiguration by removing the misconfiguration in at least the subset of the plurality of resources, wherein identifying the misconfiguration comprises identifying the misconfiguration as part of Continuous Integration/Continuous Delivery (CI/CD) pipelines in at least one environment, wherein the at least one environment comprises the production environment.

2. The method of claim 1, further comprising:
automatically reconciling the configuration change in at least the subset of the plurality of resources based on at least one of the change management policy, the organizational policy, the standard, and the procedure.

3. The method of claim 2, further comprising:
automatically reconciling the configuration change in at least the subset of the plurality of resources for remediating the misconfiguration.

4. The method of claim 2, wherein automatically reconciling the configuration change comprises:
identifying an approved configuration change versus an unapproved configuration change based on one of a first metadata and a second metadata;
identifying the configuration change made by an adversary for at least one of an exfiltration of data and compromising of confidentiality, integrity, and availability of data, as opposed to the approved configuration change made by the organization legitimately; and
automatically reconciling the configuration change made for remediating the misconfiguration.

5. The method of claim 1, further comprising:
determining whether one of a weakness caused by the misconfiguration still exists in at least the subset of the plurality of resources.

6. The method of claim 1, further comprising:
remediating the misconfiguration by removing the misconfiguration in at least the subset of the plurality of resources.

7. The method of claim 1, further comprising:
determining at least one of a threat, a likelihood, an impact, a risk, and a risk statement based on threat modeling using a risk engine; and
generating a risk score based on the determination of at least one of the threat, the likelihood, the impact, the risk, and the risk statement.

8. The method of claim 7, further comprising:
generating a recommendation related to remediating the misconfiguration based on the risk score, wherein the recommendation comprises an instruction for automatically remediating the misconfiguration in a prioritized order.

9. A method comprising:
automatically determining, in a system within an organization, a misconfiguration by comparing a specific configuration of a target environment to a corresponding baseline configuration, wherein the misconfiguration is due to a cyber-attack and comprises a configuration change; and
automatically identifying a root cause of the misconfiguration using a machine learning algorithm.

10. The method of claim 9, wherein automatically identifying the root cause of the misconfiguration using the machine learning algorithm comprises:
monitoring at least one of the misconfiguration and the configuration change occurring over a period of time;
analyzing at least one of the misconfiguration and the configuration change occurring over the period of time; and
automatically identifying the root cause of the misconfiguration using the machine learning algorithm based on the monitoring and analysis performed.

11. The method of claim 10, wherein automatically identifying the root cause of the misconfiguration using the machine learning algorithm comprises:
determining a privilege escalation of a user; and
identifying whether the privilege escalation of the user as the root cause of the misconfiguration.

12. A method comprising:
automatically determining, in a system within an organization, a misconfiguration by comparing a specific configuration of a target environment to a corresponding baseline configuration, wherein the misconfiguration is due to a cyber-attack and comprises a configuration change; and
automatically generating a report comprising the misconfiguration across at least one of an infrastructure, a platform, an application layer, and a failure of the system that is in association with the target environment.

13. The method of claim 12, wherein the report depicts nonobvious dependency between the misconfiguration in at least a subset of a plurality of resources.

14. The method of claim 12, wherein the report provides a hint at how an adversary exploits the misconfiguration across at least one of a plurality of system and a plurality of application layer.

15. The method of claim 12, wherein the report further provides a suggestion regarding addressing prioritization of the misconfiguration.

16. A method comprising:
automatically generating a System Security Plan (SSP) through an artifact builder using at least one of an environment topology, a component baseline, a component security policy, a first metadata, and an application centric system architecture.

17. The method of claim 16, wherein the SSP comprises at least one of a system metadata summary, a system boundary, and an SSP line item.

18. The method of claim 17, wherein the SSP line item comprises at least one of a security control description, a security control implementation status, a security control implementation remark, and a security control implementation origin and description of how a control is implemented.

19. The method of claim 16, further comprising:
automatically generating a Security Assessment Plan (SAP) through the artifact builder using the component security policy,
wherein the component security policy comprises contents of the System Security Plan (SSP).

20. The method of claim 19, wherein the SAP defines at least one of a system automated test plan and a category of the system automated test plan based on details of a test to be performed by a test code comprising a category of test, wherein the category of test comprises details regarding the test to be performed in at least one of an infrastructure, a platform, a database, and a custom application component; and a list of manual tests to be performed in at least a subset of a plurality of resources.

21. The method of claim 20, further comprising:
automatically generating a Security Assessment Report (SAR) based on target resource security configuration test results.

22. The method of claim 21, wherein the Security Assessment Report comprises an at least one test result for each resource in at least the subset of the plurality of resources identified in the component baseline for each line item of the security assessment plan (SAP), wherein the component baseline, the first metadata and a second metadata together provide complete context of the resources of at least the subset of the plurality of resources along with the test result.

23. A computing system comprising:
a computer network; and
a plurality of resources across the computer network, the plurality of resources comprising a plurality of data processing devices and components associated therewith executing across the plurality of data processing devices, at least one data processing device of the plurality of data processing devices configured to:
automatically determine, in a system within an organization, a misconfiguration by comparing a first specific configuration of a target environment to a corresponding baseline configuration;
automatically identify, in the system within the organization, a configuration change in at least a subset of a plurality of resources, wherein the configuration change is due to a cyber-attack and comprises the misconfiguration;
automatically detect, in the system within the organization, a non-compliance with respect to at least one of a change management policy, an organizational policy, a standard, and a procedure;
execute a configuration engine thereon,
in accordance with an execution of the configuration engine, discover at least the subset of the plurality of resources that is associated with the target environment of the computing system based on querying a first metadata associated with the plurality of resources in the target environment;
in accordance with a discovery,
generate an environment definition associated with the target environment based on combining information relevant to test configurations pertinent to all resources corresponding to at least the subset of the plurality of resources from all layers of a multi-layered system architectural model of the target environment, a multi-layered system architectural model specifying connections across all the resources corresponding to at least the subset of the plurality of resources, and an environment definition specifying configuration requirements of at least the subset of the plurality of resources in the target environment;
build a baseline configuration and a policy for at least the subset of the plurality of resources in accordance with the environment definition;
build a second metadata for at least the subset of the plurality of resources in accordance with the policy, the second metadata providing a plurality of contexts to the environment definition;
version, in a repository of the computing system, the environment definition, the baseline configuration, the policy, the second metadata, and a test instruction pertinent to scanning the target environment for the configurations;
in accordance with tracking the second metadata versioned in the repository,
automatically scan at least the subset of the plurality of resources in accordance with the environment definition based on executing the test instruction pertinent to scanning the target environment for the configurations and retrieving at least one of: the first specific configuration and a second specific configuration therefrom based on the scanning; and
at least one of:
automatically determine the misconfiguration based on comparing the first specific configuration to the corresponding baseline configuration versioned in the repository; and
verify that a sequence of the configurations is correctly defined based on the second specific configuration.

24. A non-transitory medium, readable through at least one data processing device of a computing system and comprising instructions embodied therein, with the instructions configured to execute on the at least one data processing device, the non-transitory medium comprising the instructions to:
automatically determine, in a system within an organization, a misconfiguration by comparing a specific configuration of a target environment to a corresponding baseline configuration;
automatically identify, in the system within the organization, a configuration change in at least a subset of a plurality of resources, wherein the configuration change is due to a cyber-attack and comprises the misconfiguration; and
automatically detect, in the system within the organization, a non-compliance with respect to at least one of a change management policy, an organizational policy, a standard, and a procedure;
automatically scanning at least the subset of the plurality of resources, in accordance with an environment definition based on executing a test instruction pertinent to scanning the target environment for configurations and retrieving the specific configuration therefrom based on the scanning, wherein automatically scanning at least the subset of the plurality of resources comprises invoking the scanning in at least the subset of the plurality of resources in at least one stage of a software development prior to deployment of at least the subset of the plurality of resources to a production environment;
identifying the misconfiguration in the at least one stage of the software development at one of before and during the deployment to the production environment; and
remediating the misconfiguration by removing the misconfiguration in at least the subset of the plurality of resources,
wherein identifying the misconfiguration comprises identifying the misconfiguration as part of Continuous Integration/Continuous Delivery (CI/CD) pipelines in at least one environment, wherein the at least one environment comprises the production environment.

* * * * *